(12) United States Patent
Wang et al.

(10) Patent No.: US 11,073,867 B2
(45) Date of Patent: Jul. 27, 2021

(54) DISPLAY DEVICE AND DISPLAY METHOD (71) Applicant: BOE TECHNOLOGY GROUP CO., LTD., Beijing (CN)

(72) Inventors: Zifeng Wang, Beijing (CN); Yan Ren, Beijing (CN); Lei Cao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 55 days.

(21) Appl. No.: 16/202,342

(22) Filed: Nov. 28, 2018

(65) Prior Publication Data
US 2019/0235577 A1 Aug. 1, 2019

(30) Foreign Application Priority Data

Jan. 31, 2018 (CN) .......................... 201810100900.1

(51) Int. Cl.
*G06F 1/16* (2006.01)
*G09G 5/373* (2006.01)
(Continued)

(52) U.S. Cl.
CPC ............ *G06F 1/1652* (2013.01); *G06F 3/013* (2013.01); *G09G 5/373* (2013.01); *H04N 5/00* (2013.01);
(Continued)

(58) Field of Classification Search
CPC ......... G06F 1/1652; G06F 3/013; H04N 5/00; H04N 5/64; G09G 5/373; G09G 2380/02; G09F 9/301
See application file for complete search history.

(56) References Cited

U.S. PATENT DOCUMENTS

| 5,186,336 A | * | 2/1993 | Pippin | ................... B07C 5/3412 |
| | | | | 198/367.2 |
| 2003/0071800 A1 | * | 4/2003 | Vincent | ................. G06F 1/1677 |
| | | | | 345/204 |

(Continued)

FOREIGN PATENT DOCUMENTS

| CN | 103123560 A | 5/2013 |
| CN | 104021749 A | 9/2014 |

(Continued)

OTHER PUBLICATIONS

First Office Action for Chinese Patent Application No. 201810100900.1 dated Aug. 12, 2019.

*Primary Examiner* — Kee M Tung
*Assistant Examiner* — Khoa Vu
(74) *Attorney, Agent, or Firm* — Calfee, Halter & Griswold LLP (57) ABSTRACT

A display device includes a display screen having a first and second ends opposite to each other in a length direction of the display screen; a receiving member connected to the first end, a visible area of the display screen includes a display area, as the second end moves forth and back relative to the receiving member in the length direction, the display screen may be gradually retracted to the receiving member or unfolded from the receiving member, so that a size of the display area changes continuously; a sensor assembly that is used for detecting motion condition of the display screen being retracted or unfolded; and a controller that is configured, according to the motion condition of the display screen, to control the display area with a size continuously changed in the display screen to display a screen corresponding to a size of the display area in real time.

14 Claims, 11 Drawing Sheets

(51) Int. Cl.
*G06F 3/01* (2006.01)
*H04N 5/00* (2011.01)
(52) U.S. Cl.
CPC ..... *G09G 2354/00* (2013.01); *G09G 2380/02* (2013.01)

(56) References Cited

U.S. PATENT DOCUMENTS

| | | | | |
|---|---|---|---|---|
| 2013/0127917 A1* | 5/2013 | Kwack | ................ | G06F 1/1652 345/660 |
| 2014/0204037 A1* | 7/2014 | Kim | .................... | G06F 1/1647 345/173 |
| 2016/0246470 A1* | 8/2016 | Doi | ........................ | G09G 5/00 |
| 2016/0307545 A1* | 10/2016 | Lee | ......................... | G09G 5/38 |
| 2016/0320871 A1* | 11/2016 | Li | ........................... | G06F 3/017 |
| 2017/0011714 A1* | 1/2017 | Eim | ...................... | G09G 5/373 |
| 2017/0259588 A1* | 9/2017 | Fernandez | ................ | B41J 3/60 |

FOREIGN PATENT DOCUMENTS

| | | | | |
|---|---|---|---|---|
| CN | 104461442 A | | 3/2015 | |
| CN | 104461444 A | | 3/2015 | |
| CN | 106448465 A | * | 2/2017 | ............ G09F 9/301 |
| CN | 106448465 A | * | 2/2017 | ............ G09F 9/301 |
| CN | 106448465 A | | 2/2017 | |
| CN | 106816093 A | | 6/2017 | |
| JP | 2005092224 A | | 4/2005 | |

* cited by examiner

DISPLAY DEVICE AND DISPLAY METHOD

CROSS REFERENCE

This application is based upon and claims priority to Chinese Patent Application No. 201810100900.1, filed on Jan. 31, 2018, the entire contents thereof are incorporated herein by reference.

TECHNICAL FIELD

The present disclosure relates to a display technical field, in particular, to a display device and a display method.

BACKGROUND

As increasing development of display technique, a display device having a visible area with an adjustable size gradually enters people's daily life. It is indicated that a flexible display device is more suitable for the display device having the visible area with the adjustable size (hereinafter referred to as the adjustable display device) due to flexible and foldable characteristics of the flexible display device.

SUMMARY

According to one aspect of the present disclosure, a display device includes:
a display screen that has first and second ends opposite to each other in a length direction of the display screen;
a receiving member that is connected to the first end of the display screen, a portion of the display screen exposed to the outside of the receiving member being a visible area, and the visible area including a display area, as the second end moves forth and back relative to the receiving member in the length direction, the display screen may be gradually retracted to the receiving member or gradually unfolded from the receiving member, so that a size of the display area changes continuously;
a sensor assembly that is used for detecting motion condition of the display screen being retracted or unfolded; and
a controller that is configured, according to the motion condition of the display screen, to control the display area with a size continuously changed in the display screen to display a screen corresponding to a size of the display area in real time.

According to one implementation of the present disclosure, the display device further includes a limiting member; the sensor assembly component and the limiting member are respectively located on both sides of the display screen in a thickness direction, and both are in contact with the display screen, and the sensor assembly is used for detect a real-time motion characteristics of the display screen.

According to one implementation of the present disclosure, the receiving member includes an outer frame and an opening provided one side of the outer frame close to the display screen, and the first end of the display screen protrudes from the opening into the receiving member.

According to one implementation of the present disclosure, the display device further includes a limiting member; the sensor assembly component and the limiting member are respectively located on both sides of the display screen in a thickness direction, and both are in contact with the display screen.

According to one implementation of the present disclosure, the receiving member includes:
an outer frame that is provided with an opening on one side of the outer frame close to the display screen, and the first end of the display screen extends from the opening into the receiving member.

According to one implementation of the present disclosure, the sensor assembly includes:
a first guide rod that is disposed in the receiving member and in contact with the display screen, the first guide rod being rotated along with movement of the display screen, and
a sensor that is connected to the first guide rod, for detecting a rotational speed of the first guide rod to obtain an actual size of the visible area in the display screen.

According to one implementation of the present disclosure, the first guide rod is a rigid rod, and an outer surface of the first guide rod is provided with a soft protective layer at least at a portion in contact with the display screen.

According to one implementation of the present disclosure, the display screen is a flexible display screen; the receiving member is provided with a retracting means, to which the first end of the display screen is fixedly connected; and the flexible display screen is controlled by the retracting means to be retracted or unfolded.

According to one implementation of the present disclosure, the retracting means includes a reel parallel to the first guide rod, and the first end of the display screen is fixed on the reel, such that the flexible display screen is retracted or unfolded as the rotation of the reel.

According to one implementation of the present disclosure, the limiting member includes:
a second guide rod that is disposed in the receiving member and in contact with the display screen, and the first guide rod and the second guide rod are located on both sides of the display screen, and disposed parallel to each other;
a distance between a projection of a midpoint of a portion where the first guide rod is in contact with the display screen and a projection of a midpoint of a portion where the second guide rod is in contact with the display screen, in a vertical face perpendicular to a plane in which the visible area is located is equal to or less than the thickness of the display screen.

According to one implementation of the present disclosure, the second guide rod is a rigid rod, and an outer surface of the second guide rod is provided with a soft protective layer at least at a portion in contact with the display screen.

According to one implementation of the present disclosure, the display screen is a rigid display screen.

According to one implementation of the present disclosure, an area of the display screen in addition to the display area is a non-display area; an opening of the outer frame has an outer edge and an inner edge; a boundary line between the display area and the non-display area is correspondingly provided between the outer edge and the inner edge of the opening.

According to one implementation of the present disclosure, an area of the display screen in addition to the display area is a non-display area; and an opening of the outer frame has an outer edge and an inner edge; a boundary line between the display area and the non-display area is defined by an inclined angle, wherein a plane formed by connecting the boundary line with the outer edge of the opening is a first plane, and a plane passing through the boundary line and perpendicular to the display area is a second plane; an angle between the second plane and the first plane is an inclined angle in a range of 20° to 45°.

According to one implementation of the present disclosure, the display device further includes:

a detection module for detecting a position of an observer's eyes;

the controller is further configured to, when the position of the observer's eyes is in a preset area, take a sub-image adapted to the size of the display area from an image to be display in real time, and display the sub-image in the display area, wherein starting positions taken from a plurality of the sub-images are the same, but finishing positions are different;

wherein, the preset area is a sector area formed by deviating by 20° to 45° respectively towards both sides of the first end and the second end at an outer edge of the opening along a plane perpendicular to the display area.

According to one implementation of the present disclosure, the detection module includes an image acquisition device and a distance detection device.

According to one implementation of the present disclosure, the controller is further configured to, when a moving speed of the display screen is less than 4 m/min, take the sub-image adapted to the size of the display area from the to-be-displayed image in real time, and display the sub-image in the display area, wherein the starting positions taken from the plurality of the sub-images are the same, but the finishing positions are different.

According to another aspect of the present disclosure, a display method for a display device includes:

detecting a moving speed of the display screen in the display device relative to the receiving member in a length direction; and controlling a visual area that continuously changes in size in the display screen to display a screen adapted to the size of the display area in real time.

According to one implementation of the present disclosure, the display method further includes:

when a moving speed of the display screen is less than 4 m/min, taking a sub-image adapted to the size of the display area from an to-be-displayed image in real time, and displaying the sub-image in the display area, wherein starting positions taken from a plurality of sub-images are the same, and finishing positions thereof are different.

According to one implementation of the present disclosure, the display device includes a detection module, and the display method further includes:

detecting a position of an observer's eyes;

when the position of the observer's eye is within a preset area, taking a sub-image adapted to the size of the display area from an image to be display in real time, and displaying the sub-image in the display area, wherein the starting positions taken from a plurality of sub-images are the same, and the finishing positions thereof are different, wherein the preset area is a sector area formed by deviating by 20° to 45° respectively towards both sides of the first end and the second end at an outer edge of the opening along a plane perpendicular to the display area.

BRIEF DESCRIPTION OF THE DRAWINGS

In order to more clearly illustrate embodiments of the present disclosure or the technical solutions in the prior art, hereinafter the drawings need to be used in the embodiments or description of the prior art will be briefly introduced. Obviously, the drawings as described below are only exemplary, based on which the other drawings may be obtained by the person skilled in the art without any creative work.

DETAILED DESCRIPTION

Hereinafter, the technical solutions in the embodiments of the present disclosure will be clearly and completely described with reference to the accompanying drawings. Obviously, the described embodiments are merely a part of the embodiments, but not all of the embodiments of the present disclosure. All other embodiments obtained by the person skilled in the art based on the embodiments of the present disclosure without creative effort are within the scope of the present disclosure.

In the related technology, for a flexible adjustable display device, the visible area of the display device is adjusted to a target size, and then the visible area corresponding to the target size accordingly displays a display screen with a size corresponding to target size, that is, the flexible adjustable display device only displays the screen of the corresponding size after the size adjustment is completed. However, the visible area of the display device cannot display the screen during the size adjustment, so that peoples' needs for displaying different scenes cannot be satisfied, and lowering the user's experience.

An embodiment of the present disclosure provides a display device and a display method, which avoids a problem in the prior art where the display cannot perform during an adjustment of the size of the visible area.

Figure 1:
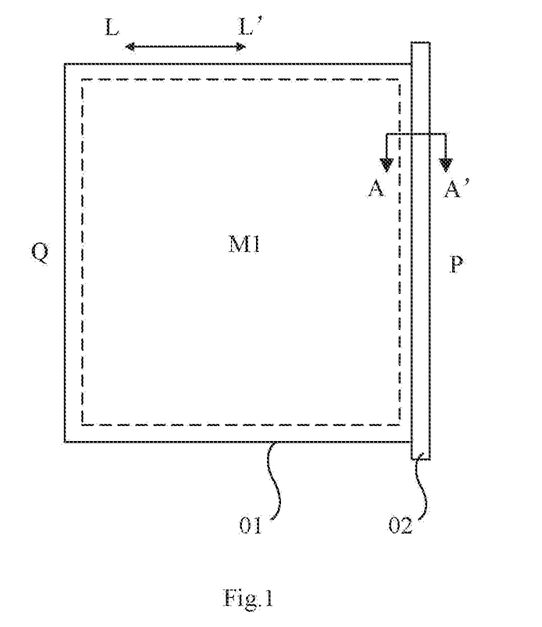
FIG. 1 is a schematic view of a display device according to an embodiment of the present disclosure.
Figure 2:
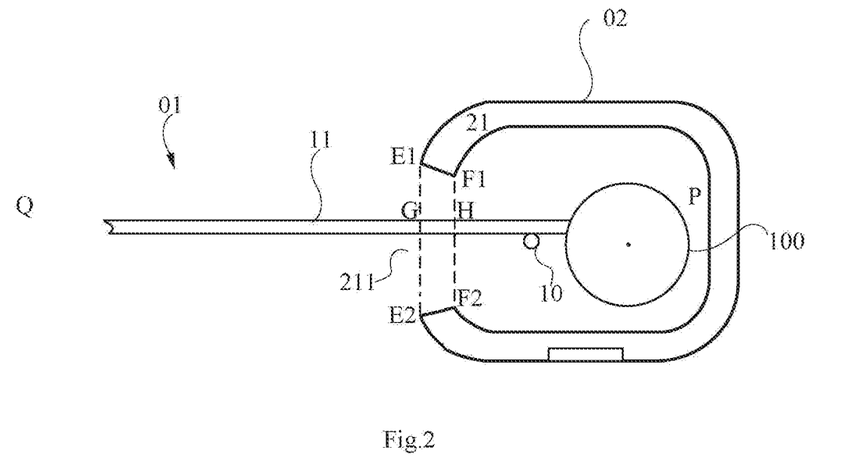
FIG. 2 is an enlarged sectional schematic view taken along a line A-A' in FIG. 1.

An embodiment of the present disclosure provides a display device. As shown in FIG. 1 or FIG. 2, the display device includes a display screen 01, a receiving member 02, a sensor assembly and a controller. The display screen 01 includes a first end P and a second end Q, which are opposite to each other in a length direction L-L' of the display screen. The first end P is connected with the receiving member 02. A portion of the display screen 01 exposed to the outside of the receiving member 02 is a visible area 11. The visible area 11 includes a display area M1, for example, the portion within a dotted rectangular frame in FIG. 1. As the second end Q moves reciprocatingly relative to the receiving member 02 along the length direction L-L', the display screen 01 may gradually retract to the receiving member 02 or gradually expand from the receiving member 02, so that a size of the display screen 01 continuously changes, and thereby the size of the display area M1 also continuously changes.

For the receiving member 02 in the display device having a display area with an adjustable size of the present disclosure, especially the receiving member 02 of a handheld display device, for example, as shown in FIG. 2, the receiving member 02 includes an outer frame 21, and an opening 211 provided on a side of the outer frame (near one side of the display screen). The first end P of the display screen 01 protrudes into the receiving member 02 from the opening 211. The receiving member 02 may further include devices other than the outer frame 21.

A sensor assembly is used for measuring motion condition of the display screen, for example, a moving speed of the display screen. A controller may be electrically connected to the sensor assembly. The controller may be one or more application specific integrated circuits (ASIC), digital signal processors (DSP), digital signal processing devices (DSPD), programmable logic devices (PLD), field programmable gate arrays (FPGA), micro-processors or other electronic components. The controller is used for controlling the display area having a continuously changing size in the display screen to display a screen corresponding to the size of the display area in real time, according to the motion condition of the display screen.

It should be noted that the aforesaid "display area" refers to an area for displaying the screen actually when the display device displays normally. Except for the display area M1, the visible area 11 may further include a blank area around the display area M1. It should be understood that as for the aforesaid display device, referring to FIG. 1 or FIG. 2, the display screen 01 protrudes into the receiving member 02, and has a part of the area exposed to the receiving member 02 and a part of the area hidden in the receiving member 02. When the screen is actually displayed, the portion of the display screen exposed to the receiving member 02, i.e., the area that the observer can observe is a visible area 11, and the display area M1 displays the screen when the display device is a normal working state. The portion of the display screen part hidden in the receiving member 02, i.e., the area that the observer cannot observe is a non-visible area, which does not display the screen, generally a dark state.

As the above described, during the second end of the display screen moves reciprocatingly relative to the receiving member along the length direction, and the size of the display area M1 of the display screen continuously changes, the display area M1 having the continuous changing size may display in real time the screen corresponding to the size of the display area M1, to avoid a problem that the display area cannot perform displaying during the size adjustment in the prior art, so as to meet the needs for displaying different scenes and improve the user's experience.

In the embodiment as shown in FIG. 1, the display screen 01 may be a flexible display screen, which can be bent and hidden in the receiving member 02. Due to the flexible and foldable characteristics of the flexible display screen, the flexible display screen is more suitable for a display device having the visible area with the adjustable size. Preferably, the display screen employs a flexible display screen.

Figure 4:
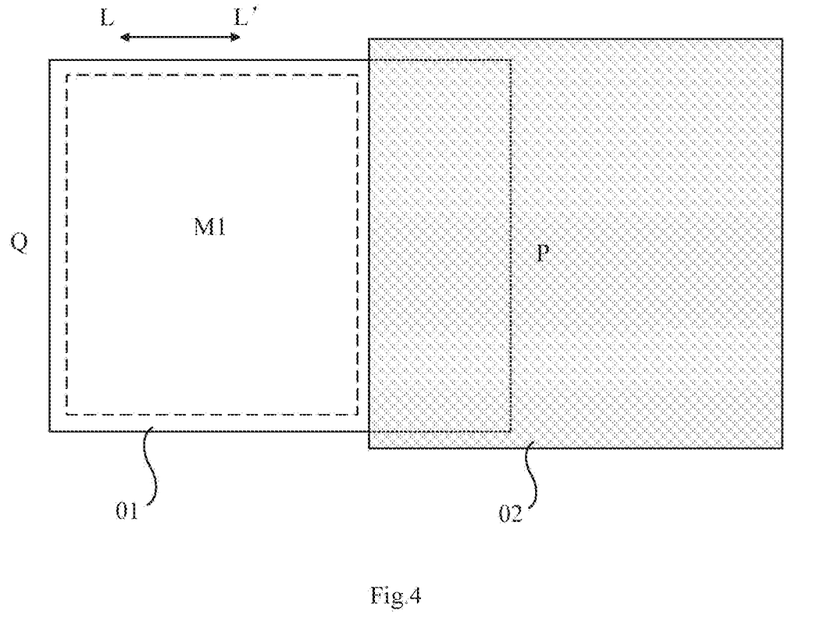
FIG. 4 is a schematic view of another embodiment of a display device according to the present disclosure.
Figure 5:
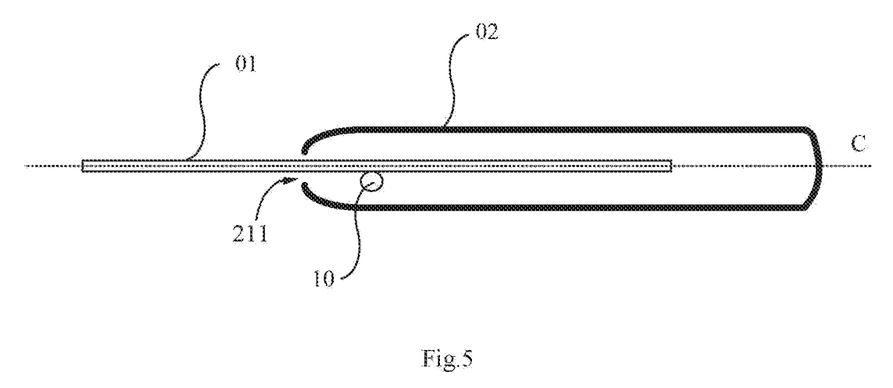
FIG. 5 is a schematic view of the cross section of FIG. 4.

In another embodiment as shown in FIG. 4 and FIG. 5, the display screen 01 may be a rigid display screen, which may move horizontally and be hidden in the receiving member 02.

In addition, the sensor assembly in the present disclosure will be further described below.

In the present disclosure, the actual setting way of the sensor assembly is not specifically limited, as long as it is able to ensure that the sensor assembly may acquire the movement condition of the display screen, so as to obtain the actual size of the visible area in the display screen in real time.

Specifically, the sensor assembly may not be in contact with the display screen. For example, a sensing camera (for example, an infrared camera) may be used to measure the movement condition of the display screen to obtain the actual size of the visible area M1 in real time.

Of course, the sensor assembly may also be in contact with the display screen. In this case, especially for the flexible display screen, since the flexible display screen itself is relatively soft, it is possible that due to poor contact between the sensor assembly and the display screen, the changes of the size of the visible area M1 cannot be accurately determined by the sensor assembly. Thereby, if the sensor in contact with the display screen is used, preferably, the display device further includes a limiting member. The limiting member and the sensor assembly are respectively located on both sides of the display screen in a thickness direction, and both are in contact with the display screen. It is ensured that the sensor assembly and the display screen are being in a contact state by the limitation of the limiting member against the display screen, so that the contact-type sensor assembly is used to capture the real-time motion characteristics of the display screen and obtain the actual size of the visible area M1 in the display screen.

In addition, for consideration of actual cost and a volume of the display device, especially for a handheld mobile display device, generally slimming design of the whole display device is required as much as possible. Therefore, the present disclosure preferably provides the aforesaid contact-type sensor assembly occupying a smaller volume.

Figure 3:
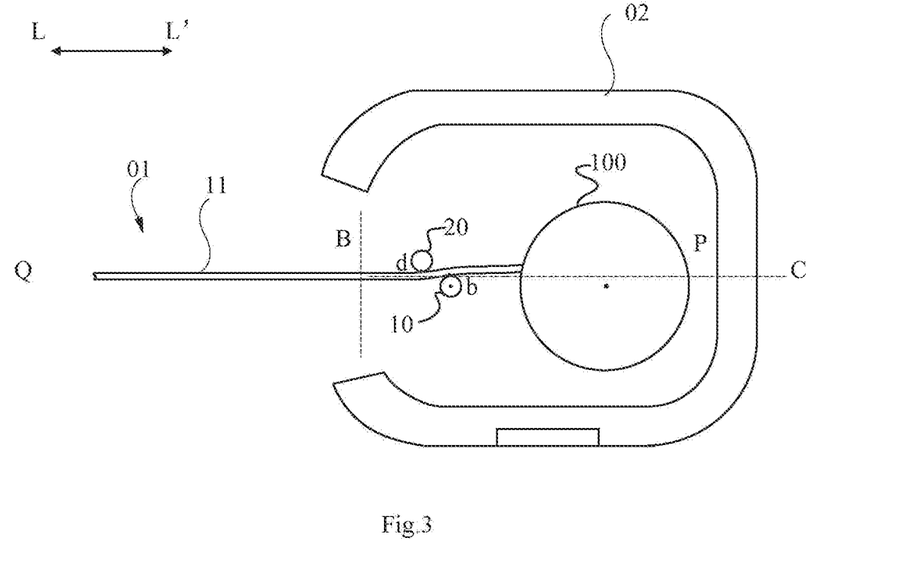
FIG. 3 is a sectional schematic view taken along a line A-A' in FIG. 1, wherein a limiting member is shown.

Under such circumstance, preferably, as shown in FIG. 3, the sensor assembly may include a first guide rod 10 (generally disposed parallel to the second end Q) disposed in the receiving member 02 and in contact with the display screen 01, and a sensor assembly (not shown) connected to the first guide rod 10. The first guide rod 10 may be rotated with the movement of the display screen to detect a rotational speed of the first guide rod 10 by the sensor assembly, such that the actual size of the visible area M1 in the display screen 01 is obtained. FIG. 3 shows an arrangement of the first guide rod 10 with respect to the flexible display screen in FIG. 1. FIG. 4 may show the arrangement of the first guide rod in the device including a rigid display screen in FIG. 2.

It should be noted that firstly, the first guide rod 10 preferably is configured as a cylindrical guide rod, that is, the first guide rod is entirely cylindrical. The present disclosure does not limit the interior of the cylindrical structure and the structure of the end face. For example, the interior of the first guide rod may be hollow, solid, or other structures; and the end face may be planar or non-planar.

Secondly, where the actual size of the visible area M1 in the display screen 01 may be obtained by measuring the rotational speed of the first guide rod 10 by the sensor assembly refers to that:

the first guide rod is in contact with the display screen and rotates along with the retraction or expansion of the display screen; of course, the retraction or expansion of the display screen is caused by the movement of the second end relative to the receiving member along a length direction, so that a product of the rotational speed (arc system) of the first guide rod and a radius of the first guide rod is equal to the moving speed of the second end; that is, by measuring the rotational speed of the first guide rod, the change rate of the size of the visible area may be obtained (of course, the size of the display screen in the width direction is generally a fixed size), so that the display device may acquire the real-time size of the visible area according to the change rate of the size of the visible area, and the display device is controlled to display a screen suitable for the size of the visible area M1 in real time.

In addition, in order to minimize the volume of the display device, especially for the flexible display screen, in view of its own bendability, it is preferable in the present disclosure that the retracting member 02 includes a retracting means disposed in the outer frame. The first end of the display screen is fixedly connected to the retracting means, such that the flexible display screen is retracted or expanded under the control of the retracting means, so as to ensure the volume of the entire display device smaller.

Particularly, in the present disclosure, the specific arrangement of the retracting means is not limited. For example, the retracting means may include a folding mechanism, such that the display screen is retracted into the receiving member by the folding device, or expanded from the receiving member. Of course, the folding way is not limited, for example, the folding way of a folding fan.

For further example, as shown in FIG. 3, on the basis of a preferred manner of using the aforesaid sensor assembly including the first guide rod 10, the retracting means may include a reel 100 parallel to the first guide rod 10. The first end P of the display screen 01 is fixed on the reel 100. The flexible display screen is retracted or expanded by rotating the reel 100. The retracting way used by the reel occupies smaller space than the retracting way of the folding, so that it is preferable in the present disclosure that the flexible display screen is retracted or expanded by using the way of arranging the reel.

On the basis of the preferred manner of using the sensor assembly including the first guide rod 10, as for the limiting member for ensuring that the first guide rod is in contact with the display screen, preferably, as shown in FIG. 5, the limiting member includes a second guide rod 20 disposed in the receiving member 02 and disposed in parallel with the first guide rod 10. The projection of the first guide rod 10 and the second guide rod 20 in the reference level C are not coincided with each other, and a distance between the opposite edges of the first guide rod 10 and the second guide rod 20 along the length direction L-L' of the display screen 01 is smaller than the thickness of the display screen 01. The reference level C is a plane formed between a scroll center 01 of the reel 100 and a scroll center 02 of the first guide rod 10.

Figure 7:
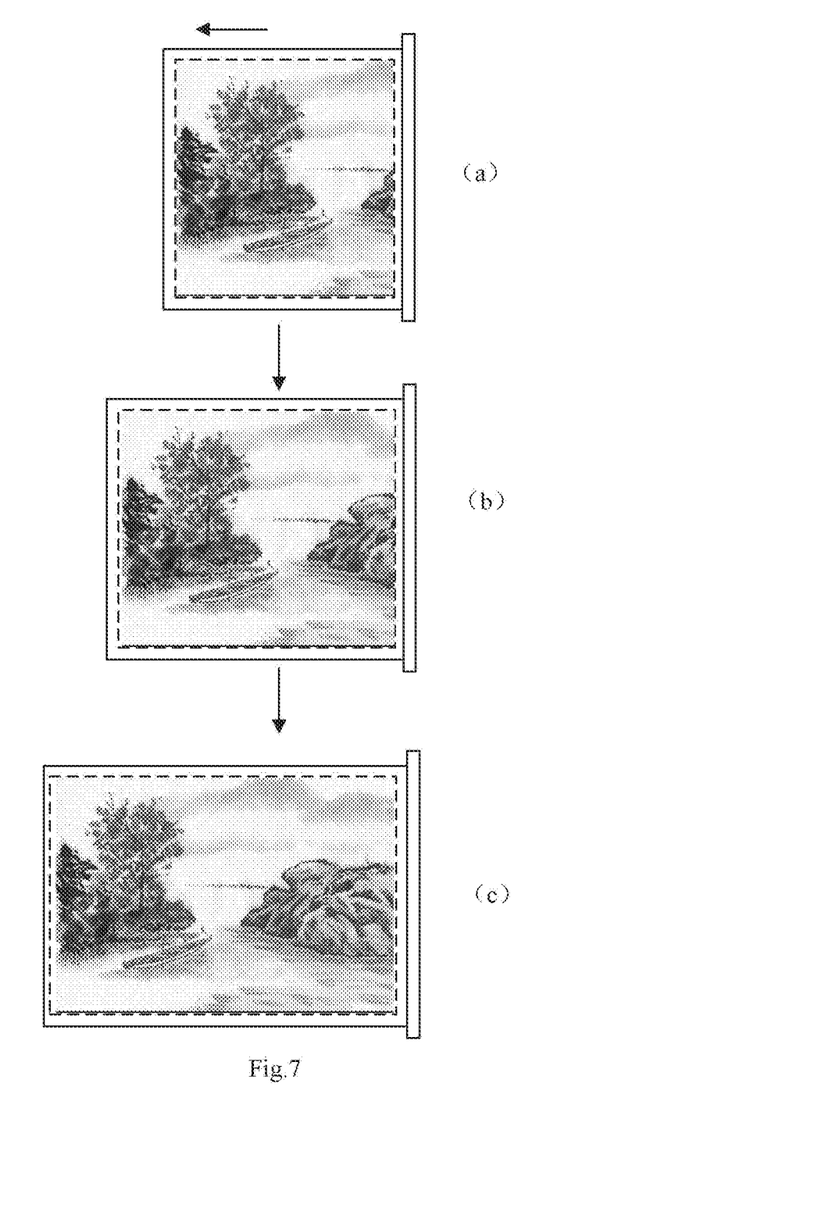
FIG. 7 is a schematic view of a second displaying mode as provided by the embodiment of the present disclosure.

In this way, the second guide rod 20 plays a certain limiting function on the display screen 01. Referring to FIG. 7, if the second end P of the display screen is deviated in a direction away from the first guide rod 10, under the limitation of the second guide rod 20, the display screen may still be in contact with the first guide rod 10. If the second end P of the display screen 01 is deviated in a direction facing toward the first guide rod 10, even if the second end P of the display screen 01 is disengaged from the second guide rod 20, the display screen itself may still be in contact with the first guide rod 10, that is, by means of the above described way of arranging the first guide rod 10 and the second guide rod 20, no matter how the second end P of the display screen is deviated, it is effectively ensured that the display screen 01 is in contact with the first guide rod 10, so that the rotational speed of the first guide rod may be detected accurately by the sensor assembly.

Of course, generally, the above second guide rod 20 is preferably configured as a cylindrical guide rod, that is, the second guide rod is generally cylindrical.

In addition, it should be understood that the limiting member as the second guide rod 20 is only a preferred mode for the designing mode of the sensor assembly including the first guide rod 10. In practice, the present disclosure does not limit the specific arranging ways of the limiting member. An appropriate limiting member may be selected according to the specific arranging mode of the sensor assembly.

Herein, it should further be noted that the first guide rod and the second guide rod are in contact with the display screen, and the first guide rod 10 may be rotated with the retraction or expansion of the display screen 01, so that the sensor assembly does not detect the rotational speed of the first guide rod accurately due to slippage between the first guide rod and the display screen. Especially for the rigid display screen, the hardness of the display screen itself is greater, the slippage between the first guide rod and the display screen is more obvious; and the second guide rod may damage the display screen due to friction between the second guide rod and the display screen.

Based on this, preferably, the first guide rod includes a rigid guide rod and a soft protective layer located on the outer surface of the rigid guide rod, thereby ensuring a greater friction force between the display screen and the first guide rod and/or the second guide rod, so as to effectively drive the first guide rod to rotate due to retraction or expansion of the display screen. The second guide rod may include a rigid guide rod and a soft protective layer located on the outer surface of the rigid guide rod, to avoid damaging the display screen due to greater friction between the second guide rod and the display screen.

Wherein, the outer surface of the rigid guide rod refers to at least the surface portion of the first guide rod and/or the second guide rod in contact with the display screen. The soft protective layer may be formed of one or more of plastics, resins and rubbers, which is not limited herein, and may be selectively arranged according to the actual requirements.

Figure 6:
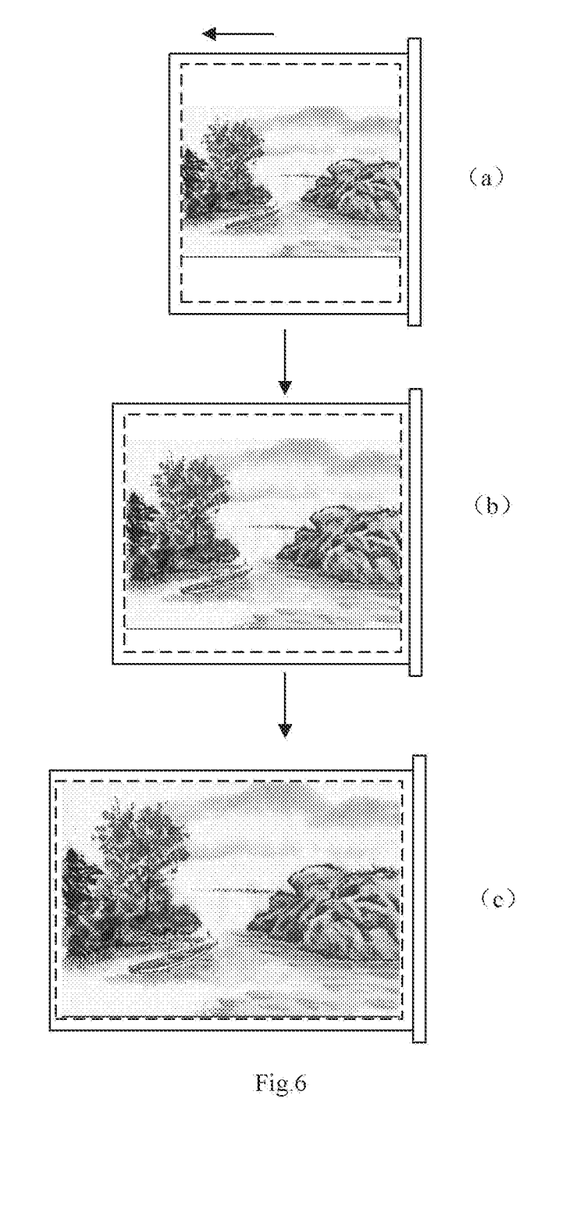
FIG. 6 is a schematic view of a first displaying mode as provided by the embodiment of the present disclosure.

In addition, it should be noted that in the present disclosure, for a screen corresponding to the size of the visible area M1, as the second end Q moves in a direction away from the receiving member 02, the size of the visible area M1 continuously increases, which refers to that:

as shown in FIG. 6, as the size of the visible area M1 continuously increases (refer to the process of (a)→(b)→(c) in FIG. 6), the overall screen displayed in the visible area M1 is controlled by a processor to be increased accordingly with increase of the size, that is, the same image is always displayed in the visible area M1, and the image is continuously enlarged during the size of the visible area M1 is continuously increased, that is to say, the images displayed by the visible areas M1 of different sizes are the same (referring to the display images in a, b, c of FIG. 6).

As shown in FIG. 7, as the size of the visible area M1 continuously increases (referring to the process of (a)→(b)→(c) in FIG. 7), the visible area M1 may be controlled by the processor to real-time display a sub-image corresponding to the size of the visible area in the same to-be-displayed image, and starting positions taken from the sub-image as displayed at each time are the same, that is, as the size of the visible area M1 is continuously increased, the corresponding size is taken in real time according to the actual size of the visible area M1 and the sub-images having the same starting positions are displayed, that is to say, under such circumstance, the images displayed in the visible area M1 of different sizes are not completely identical (referring to the display images in a, b, and c of FIG. 7).

Of course, the actual display device in practice may have the aforesaid two displaying modes simultaneously, so that the corresponding displaying mode may be selected according to actual situations to meet various needs of a user. For example, in the case of an ordinary video, entertainment, chat, etc., an ordinary displaying mode in FIG. 6 may be selected. In the case that the user needs to appreciate some paintings, a special displaying mode for continuously unfolding the image in FIG. 7 may be selected, in order to be similar to the scene in which the paintings are viewed by unfolding the painting scroll in practice. Of course, the application of the display device in the present disclosure is merely illustrative, but the present disclosure is not limited thereto.

In the present disclosure, the area of the display screen 01 in addition to the display area M1 is a non-display area. As the display screen 01 is retracted and unfolded, a boundary between the area in addition to the display area M1 and the non-display area is varied, that is, an edge of the display area M1 close to the first end P is varied. On the basis of this, in order to ensure the image displayed in the display area continuous, particularly for the second displaying mode in FIG. 7, illustratively, as an example of appreciation to the painting works, the whole painting work is continuously unfolded from the paining reel during the appreciation of the painting works in reality, in order to make the display screen to realistically simulate a scene in which the work is viewed by opening the painting reel, as shown in FIG. 2, the receiving member 02, that is, the opening 211 of the outer frame has an outer edge E1E2 and an inner edge F1F2. The boundary line between the display area M1 and the non-viewing area of the display screen 01 corresponds to a portion between the outer edge E1E2 and the inner edge F1F2 of the opening 211, that is, between marks G and F of the display screen 01.

In another embodiment, the boundary line between the display area M1 and the non-display area of the display screen 01 may be defined by an inclined angle α. A plane formed by connecting the boundary line B to the outer edge E2 of the opening 211 is a first plane. A plane C passing through the boundary line and perpendicular to the display area is a second plane. An angle between the second plane and the first plane is the inclined angle α in a range of 20° to 45°, for example, 25°, 30°, 35°, 40°, and etc.

Figure 9:
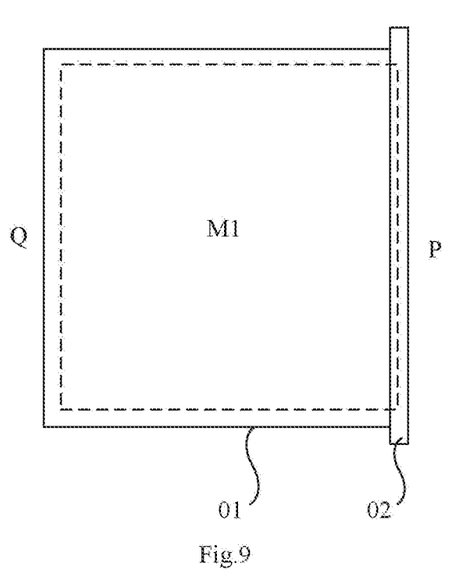
FIG. 9 is a schematic view of another embodiment of the display device according to the present disclosure.

In this way, in comparison with a large amount of the display devices in the prior art, there is a non-display portion in a dark state at a position close to the display frame (referring to the area between the display area M1 and the receiving member 02 as shown in a dotted line of FIG. 7). By using the above setting way, as shown in FIG. 9, the display area M1 of the display screen 01 may extend to the receiving member 02, the display image may be viewed even through the opening of the receiving member 02, so that the works viewed by the user through the display device is more consistent with the works as viewed in reality, and the experience is improved.

According to one embodiment of the present disclosure, since the human eyes concentrate on one position by a viewing angle, which is generally in the range of 20° to 45°, for example, 30° to the left and the right along the vertical viewing screen. Based on this, the present disclosure, for example, provides an inclined angle α of 20° to 45°, illustratively, the inclined angle α is selected to be 25°, 30°, 35°, 40° and etc.

Figure 8:
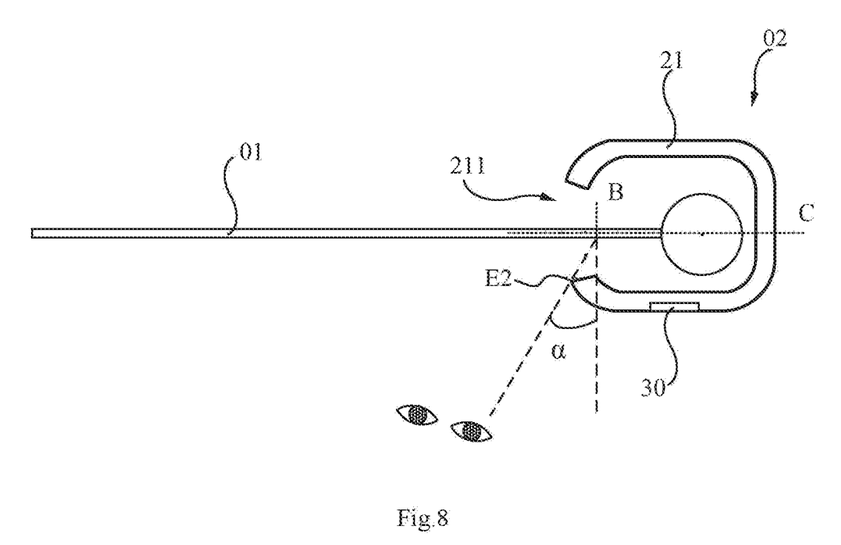
FIG. 8 is a schematic view of another embodiment of the display device according to the present disclosure.
Figure 10:
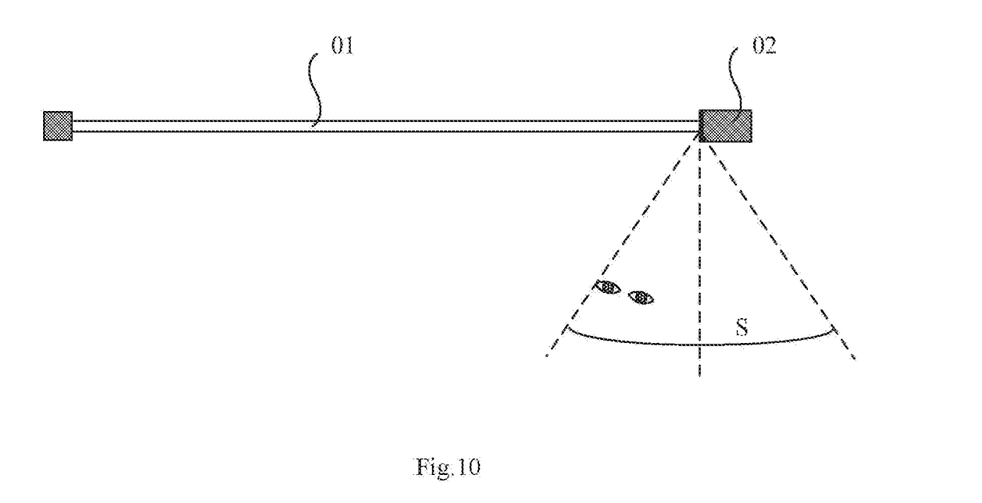
FIG. 10 is a schematic view of another embodiment of the display device according to the present disclosure, showing a preset area of the eyes.

On the basis of this, in order to improve an intelligent control of the display device according to one embodiment of the present disclosure, the display device may be directly switched to the second displaying mode of the aforementioned work appreciation by detecting the user's practical situation. As shown in FIG. 8, the display device further includes a detection module 30, wherein the detection module 30 may be disposed on a frame of the receiving member 02 located on the display side (i.e., one side of the human eyes in FIG. 8) to detect the position of the observer's eyes by the detection module 30, in this way, the controller, when the observer's eyes are within a preset area S (referring to FIG. 10), may take sub-images corresponding to the size of the display area in real time from the to-be-displayed image, and the sub-images are displayed in the display area, wherein the plurality of the taken sub-images have the same starting position, and different finishing positions, that is, the display device is controlled to enter the second displaying mode of the aforementioned works appreciation for displaying.

Of course, the controller, when the moving speed of the display screen 01 is within the preset speed, for example, less than 0.5 m/min, may also take the sub-images corresponding to the size of the display area in real time from the to-be-displayed image, and the sub-images are displayed in the display area, wherein the plurality of the taken sub-images have the same starting position, and different finishing positions, that is, the display device is controlled to enter the second displaying mode of the aforementioned works appreciation for displaying.

It should be noted that the preset area S is a sector-shaped area formed by referring to deviating by 20° to 45° respectively to the first end P of the display screen and the second end Q of the display screen, within a first preset distance from the display screen, and on the outer edge of the opening 211 located on the display side of the display screen along a the plane perpendicular to the visible area. The area is selected based on an area range where people concentrated in viewing some position are substantially positioned. In addition, the above preset speed range is selected based on the speed range in which the paining reel is opened when people appreciate the works, for example, the preset speed may be set between 0 and a conventional speed for unfolding the paining reel.

As described above, the controller may select the second displaying mode of the works appreciation for displaying when the observer's eyes are in the preset area; or select the second displaying mode for displaying when the moving speed of the display screen is within the preset speed. Of course, in order to approach to the actual situation, the second displaying mode may be selected for displaying when the observer's eyes are in the preset area and the moving speed of the display screen is within the preset speed.

Particularly, the detection module 30 may include an image capturing device and a distance detection device, wherein the image capturing device may be a camera, and the distance detection device may be an infrared sensing device, and a specific area of the observer's eyes is detected by combination of the image capturing device and the distance detection device.

Figure 11:
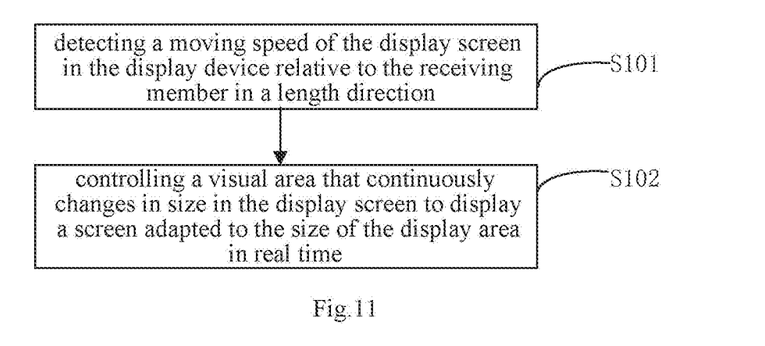
FIG. 11 is a flowchart of one embodiment of a display method of a display device according to the present disclosure.

The embodiment of the present disclosure further provides a display method of the display device. As shown in FIG. 11, the display method includes:

step S101: measuring a moving speed of the display screen in the display device relative to the receiving member in a length direction;

step S102: controlling the display area having continuously changing size in the display screen to display a screen corresponding to the size of the display area in real time.

According to one embodiment of the present disclosure, when the moving speed of the display screen is less than or equal to the conventional speed of unfolding painting reel, for example, 4 m/min, the sub-images adapted to the size of the display area are taken from the to-be-displayed image in real time, and the sub-images are displayed in the display area, wherein a plurality of the taken sub-images have the same starting positions, and different finishing positions, that is, the display device is controlled to enter the second displaying mode of the works appreciation for displaying, and the display device may be controlled to enter the first displaying mode when the moving speed of the display screen is faster.

According to another embodiment of the present disclosure, when the display device includes a detection module, the display method further includes:

detecting a position of the observer's eyes.

When the observer's eyes are within a preset area, taking the sub-images adapted to the size of the display area from the to-be-displayed image in real time, and displaying the sub-images in the display area, wherein a plurality of the sub-images are taken to have the same starting positions and different finishing positions, wherein the preset area is a sector area formed by deviating by 20° to 45° respectively towards both sides of the first end and the second end at an outer edge of the opening along a plane perpendicular to the display area, that is, controlling the display device to enter the second displaying mode of the aforementioned works appreciation for displaying, and controlling the display device to enter the first displaying mode when the observer's eyes are not within the preset area.

According to a further embodiment of the present disclosure, for simultaneously satisfying the following conditions: the position of the observer's eyes is located within the preset area and the position of the observer's eyes is located within a preset area, the display device is controlled to enter the second displaying mode of the aforesaid works appreciation for displaying, but when the conditions are not satisfied, the display device may be controlled to enter the first displaying mode.

Of course, the related information of the display device may refer to the foregoing contents, herein omitted.

It may be appreciated to those skilled in the art that all or part of the steps of the foregoing embodiments may be implemented by hardware instructed by a computer program. The program may be stored in a computer-readable storage medium. As being executed, the program performs the steps in foregoing method embodiments. The storage medium includes mediums that may store various program codes, such as a ROM, a RAM, a magnetic disk, or an optical disk.

By use of the display method of the present disclosure, when the second end of the display screen moves reciprocatingly relative to the receiving member in a longitudinal direction, during the size of the visible area of the display screen continuously changes, the visible area having continuously changing size may display the screen adapted to the size of the visible area, to avoid the problem that displaying cannot be performed during the size of the display area is adjusted.

The above description is only the specific embodiments of the present disclosure, but the extent for protection of the present disclosure is not limited thereto. Any person skilled in the art may easily envisage of changes or substitutions within the technical scope of the present disclosure. The changes or the substitutions should be covered within the protection scope of the present disclosure. Therefore, the protection scope of the present disclosure should be determined by the protection scope of the claims.

What is claimed is:

1. A display device comprising:
a display screen having a first end and a second end opposite to each other in a length direction of the display screen;
a housing connected to the first end of the display screen, a portion of the display screen exposed to the outside of the housing being a visible area, and the visible area including a display area, as the second end moves forth and back relative to the housing in the length direction, the display screen may be gradually retracted to the housing or gradually unfolded from the housing, so that a size of the display area changes continuously;
a sensor assembly for detecting motion condition of the display screen being retracted or unfolded; and
a controller that is configured, according to the motion condition of the display screen, to control the display area with a size continuously changed in the display screen to display a screen corresponding to a size of the display area in real time.
wherein the display device further comprises a second guide rod; where the sensor assembly component and the second guide rod are respectively located on both sides of the display screen in a thickness direction, and both are in contact with the display screen,
wherein the sensor assembly comprises a first guide rod that is disposed in the housing and in contact with the display screen, the first guide rod being rotated along with movement of the display screen, wherein the second guide rod is in contact with the display screen, and the first guide rod and the second guide rod are located on both sides of the display screen, and disposed parallel to each other; and a sensor that is connected to the first guide rod, for detecting a rotational speed of the first guide rod to obtain an actual size of the visible area in the display screen,
wherein the retracting means comprises a reel parallel to the first guide rod, and the first end of the display screen is fixed on the reel, such that the flexible display screen is retracted or unfolded as a rotation on the reel,
wherein a distance between a projection of a midpoint of a portion where the first guide rod is in contact with the display screen and a projection of a midpoint of a portion where the second guide rod is in contact with the display screen, in a vertical face perpendicular to a plane in which the visible area is located is less than a thickness of the display screen,
wherein an orthographic projection of a center of the first guide rod on the display screen and the orthographic projection of a center of the second guide rod on the display screen do not coincide with each other.

2. The display device according to claim 1, wherein the housing comprises:
an outer frame that is provided with an opening on one side close to the display screen, and the first end of the display screen extends from the opening into the housing.

3. The display device according to claim 2, wherein an area of the display screen in addition to the display area is a non-display area; an opening of the outer frame has an outer edge and an inner edge; a boundary line between the display area and the non-display area is correspondingly provided between the outer edge and the inner edge of the opening.

4. The display device according to claim 2, wherein an area of the display screen in addition to the display area is a non-display area; and an opening of the outer frame has an outer edge and an inner edge; a boundary line between the display area and the non-display area is defined by an inclined angle, wherein a plane formed by connecting the boundary line with the outer edge of the opening is a first plane, and a plane passing through the boundary line and perpendicular to the display area is a second plane; an angle between the second plane and the first plane is an inclined angle in a range of 20° to 45°.

5. The display device according to claim 4, further comprising:
a detection module for detecting a position of an observer's eyes;
the controller is further configured to, when the position of the observer's eyes is in a preset area, take a sub-image adapted to the size of the display area from an image to be display in real time, and display the sub-image in the display area, wherein starting positions taken from a plurality of the sub-images are the same, but finishing positions are different;
wherein, the preset area is a sector area formed by deviating by 20° to 45° respectively towards both sides of the first end and the second end at an outer edge of an opening along a plane perpendicular to the display area.

6. The display device according to claim 5, wherein the detection module comprises an image acquisition device and a distance detection device.

7. The display device according to claim 4, wherein the controller is further configured to, when a moving speed of the display screen is less than 4 m/min, take a sub-image adapted to the size of the display area from a to-be-displayed image in real time, and display the sub-image in the display area, wherein the starting positions taken from a plurality of the sub-images are the same, but finishing positions are different.

8. The display device according to claim 1, wherein the first guide rod is a rigid rod, and an outer surface of the first guide rod is provided with a soft protective layer at least at a portion in contact with the display screen.

9. The display device according to claim 1, wherein the display screen is a flexible display screen; the housing is provided with a retracting means, to which the first end of the display screen is fixedly connected; and the flexible display screen is controlled by the retracting means to be retracted or unfolded.

10. The display device according to claim 1, wherein the second guide rod is a rigid rod, and an outer surface of the second guide rod is provided with a soft protective layer at least at a portion in contact with the display screen.

11. The display device according to claim 1, wherein the display screen is a rigid display screen.

12. A display method of the display device according to claim 1,
wherein the display method comprises:
detecting a moving speed of the display screen in the display device relative to the housing in a length direction; and
controlling a visual area that continuously changes in size in the display screen to display a screen adapted to the size of the display area in real time.

13. The display method according to claim 12, wherein the display method further comprises:
when a moving speed of the display screen is less than 4 m/min, taking a sub-image adapted to the size of the display area from a to-be-displayed image in real time, and displaying the sub-image in the display area, wherein starting positions taken from a plurality of sub-images are the same, and finishing positions thereof are different.

14. The display method according to claim 12, wherein the display device comprises a detection module, and the display method further comprises:
detecting a position of an observer's eyes;
when the position of the observer's eye is within a preset area, taking a sub-image adapted to the size of the display area from an image to be display in real time, and displaying the sub-image in the display area, wherein the starting positions taken from a plurality of sub-images are the same, and the finishing positions thereof are different, wherein the preset area is a sector area formed by deviating by 20° to 45° respectively towards both sides of the first end and the second end at an outer edge of the opening along a plane perpendicular to the display area.

* * * * *